United States Patent Office
3,341,562
Patented Sept. 12, 1967

3,341,562
PROCESS FOR THE MANUFACTURE OF
PHENYL-ALUMINUM COMPOUNDS
Herbert Lehmkuhl and Rolf Schäfer, Mulheim (Ruhr),
Germany, assignors to Professor Dr. Karl Ziegler, Mulheim (Ruhr), Germany
No Drawing. Filed July 24, 1963, Ser. No. 297,204
Claims priority, application Germany, July 30, 1962,
Z 9,569
10 Claims. (Cl. 260—448)

ABSTRACT OF THE DISCLOSURE

A process for preparing phenyl aluminum compounds wherein a sodium tetra-alkyl aluminum compound is reacted with benzene in the presence of a compound selected from the group of sodium alcoholates and phenyl sodium at a temperature of from 60–250° C. and thereafter, if desired, the sodium tetraphenyl aluminum recovered can be converted into triphenyl aluminum by reaction with a compound selected from the group consisting of an aluminum halide and an alkyl aluminum halide. The phenyl aluminum compounds produced in accordance with the invention represent valuable components of polymerization catalysts and are also suitable as intermediates in the production of phenyl boron compounds.

The invention relates to the manufacture of phenyl aluminum compounds by the reaction of sodium tetra-alkyl aluminum compounds with benzene in the presence of compounds selected from the group consisting of sodium alcoholates and phenyl sodium.

While trialkyl aluminum compounds are readily obtainable from aluminum metal, olefins and hydrogen, there is no similar process for the manufacture of phenyl aluminum compounds. Accordingly, it has been necessary to use processes which ultimately start from benzene halides.

In accordance with the present invention, however, it has now proved possible to couple the synthesis of phenyl compounds of aluminum with the synthesis of trialkyl aluminum compounds obtained for instance from aluminum, hydrogen and ethylene. In this way there are obtained phenyl aluminum compounds whose phenyl groups are derived not from a benzene halide but direct from benzene.

It has been found that sodium tetra-alkyl aluminum compounds react with benzene in the presence of a compound selected from the group consisting of sodium alcoholates and phenyl sodium, at temperatures between 60° and 250° C., preferably 80° to 130° C. Reaction proceeds in accordance with the following equation, wherein R signifies alkyl:

(1) $\mathrm{NaAlR_4 + C_6H_6 \rightarrow NaAl(C_6H_5)_4 + 4RH}$

The sodium tetra-alkyl aluminum compounds employed can readily be produced from trialkyl aluminum compounds with the aid of metallic sodium or by treatment with sodium hydride and olefin. The sodium tetra-alkyl aluminum dissolves during the reaction in benzene, while the resulting sodium tetraphenyl aluminum is difficult to dissolve and precipitates, so that when the reaction has ended it can be separated from the reaction mixture without difficulty.

Reaction scarcely occurs if sodium alcoholates or phenyl sodium are not present. The action of these compounds can be explained by saying that they first displace alkyl sodium from the starting compounds in accordance with the following equation:

(2) $\mathrm{NaC_6H_5 + NaAlR_4 \rightarrow NaAlR_3C_6H_5 + NaR}$

The alkyl sodium immediately reacts further in known manner with the benzene to form phenyl sodium and an alkane in accordance with the equation:

(3) $\mathrm{NaR + C_6H_6 \rightarrow NaC_6H_5 + RH}$

The resulting phenyl sodium then reacts with the sodium phenyl trialkyl aluminum formed in reaction (2) according to equation:

(4) $\mathrm{NaAlR_3C_6H_5 + NaC_6H_5 \rightarrow NaAlR_2(C_6H_5)_2 + NaR}$

The reaction proceeds in the same manner until all alkyls of the aluminum compounds have been replaced by phenyl.

If a sodium alcoholate is employed as catalyst instead of phenyl sodium then the first reaction stage is expressed by the following equation:

(5) $\mathrm{NaOR + NaAlR_4 \rightarrow NaAlR_3OR + NaR}$

This is followed in accordance with equation (3) by the reaction of the resulting alkyl sodium with benzene to form phenyl sodium which reacts further with the sodium alkoxy trialkyl aluminum, probably displacing the alkoxy radical in the complex and replacing it by phenyl since the alcoholate radical no longer appears in the final product.

On the foregoing interpretation of the reaction mechanism, very small, purely "catalytic" quantities of phenyl sodium or a sodium alcoholate should suffice for realizing the reaction in accordance with the present invention. It would appear, however, that the catalysts in the reaction are also used up by side reactions so that for a given amount of a sodium alcoholate or phenyl sodium added only a limited amount of sodium tetraphenyl aluminum results. From a practical standpoint, the process can be carried out better with alcoholates than with phenyl sodium. Optimum results are obtained by employing about one mol alcoholate per mol sodium tetra-alkyl aluminum and it has proved particularly advantageous to add the alcoholate in several portions. In this way the yields of sodium tetra-phenyl aluminum then amount to up to 70% of theory.

The alcoholates do not all show the same activity in the course of this process; it is best to use alcoholates with a hydrocarbon chain of 4 to 10 carbon atoms. For example, very good results are obtained with sodium 2-ethyl hexanolate. Such alcoholates of higher alcohols are more readily soluble in benzene than, say, sodium methylate or sodium ethylate, the reaction being then facilitated by the fact that these alcoholates can very easily be removed from the resulting sodium tetraphenyl aluminum at the end of the reaction by washing with hot benzene.

As already described, in the process according to the present invention, where alcoholates have been added complex compounds are formed as intermediate products wherein an alkyl of sodium tetraalkyl aluminum is replaced by an alkoxy radical. From this it follows logically that sodium tetraphenyl aluminum can also be obtained by starting materials like $\mathrm{NaAl(C_2H_5)_3OR}$ or $$\mathrm{NaAl(C_2H_5)_2OR_2}$$

i.e., compounds of the general formula $\mathrm{NaAlR_3OR}$ or $\mathrm{NaAlR_2(OR)_2}$. In these cases, however, the maximum yield of sodium tetraphenyl aluminum is restricted to an amount corresponding to the proportion of alkyls in the original reaction mixture. The given complex sodium alkoxy alkyl aluminum compounds may thus be regarded in the sense of the reaction of the invention as equivalents of sodium tetraalkyl aluminum, but in general no advantage is secured by starting from these materials. If, however, compounds of this kind are in any connection obtained as side products then they can with advantage be converted in accordance with the invention into sodium tetraphenyl aluminum.

The sodium tetraphenyl aluminum obtained according to the process of the invention is a white crystalline powder which is difficult to dissolve in hydrocarbons but dissolves readily in tetrahydrofuran and can be recrystallized from this medium. It has a very high melting point. It can readily be converted into aluminum triphenyl, for example, by treatment with ⅓ mol of an aluminum halide such as a solution of aluminum bromide in benzene.

Conversion into aluminum triphenyl is also very successful by treatment with liquid alkyl aluminum halides, such as methyl aluminum dichloride, dimethyl aluminum chloride, methyl aluminum sesquihalides, ethyl aluminum dichloride, diethyl aluminum chloride or ethyl aluminum sesquihalides. Reaction proceeds in accordance with Equation 6 or 7:

(6) $RAlCl_2 + 2Na[AlPh_4] \rightarrow 2AlPh_3 + RAlPh_2 + 2NaCl$ or (7) $R_2AlCl + NaAlPh_4 \rightarrow R_2AlPh + AlPh_3 + NaCl$ The alkyl phenyl aluminum compounds obtained in this way decompose under heat in vacuo into a distillate of the corresponding volatile trialkyl aluminum compound and a not readily volatile residue of triphenyl aluminum. If the reaction is carried out in tetrahydrofuran, triphenyl aluminum-tetrahydrofuranate is obtained, but from this the combined tetrahydrofuran can be separated only with difficulty.

Since phenyl compounds of aluminum are valuable components for polymerization catalysts and also serve as intermediate products for the manufacture of phenyl boron compounds, especially sodium boron tetraphenyl which plays a part in the quantitative determination of potassium, the process according to the invention, which permits the production of these compounds in a simple manner, is particularly significant.

The invention can be illustrated by the following examples.

Example 1

132.0 g. sodium tetraethyl aluminum, 120 g. sodium iso-octylate and 1000 cc. benzene are heated with stirring to 80° to 90° C. in a 2-litre flask connected by means of a reflux condenser with a gas holder. As soon as the stated temperature is reached gas formation begins. After a short time the solution turns dark brown and after about 20 hours a fine, pale powder separates out. Gas formation then becomes gradually slower and after approximately 120 hours ceases almost completely.

| Time (hours) | Amount of gas (N-litres) | Mol gas/mol NaOR |
|---|---|---|
| 3.17 | 8.56 | 0.48 |
| 6.42 | 16.3 | 0.91 |
| 9.0 | 22.77 | 1.27 |
| 13.5 | 29.24 | 1.64 |
| 28.0 | 36.74 | 2.0 |
| 35.0 | 39.79 | 2.22 |
| 56.0 | 44.34 | 2.47 |
| 95.0 | 48.89 | 2.74 |
| 119.0 | 50.62 | 2.83 |
| 167.0 | 53.08 | 2.97 |

It is allowed to cool, the brown suspension is siphoned directly into an extraction thimble in the absence of air, the colored solution is allowed to run off, then extraction is effected in a hot steam extractor with 450 cc. benzene (oil bath temperature 120° C.) for 3 to 4 hours and drying is subsequently effected in vacuo.

The yield amounts to 200–205 g.=about 70% of theory. To obtain an analytical-grade sodium tetraphenyl aluminum, the crude product can be purified as follows:

19 g. crude product are dissolved in the absence of air in just the required amount of dry, air-free tetrahydrofuran. The clear solution is siphoned off from the insoluble radicals which settle at the bottom and diluted with benzene—also dry and free from air—to double its volume. Solvent is subsequently distilled off until the boiling point of the benzene has been reached in the vapor space. The precipitated crystalline pulp is exhausted on a frit in the absence of air, washed with benzene and dried.

Na found 6.65%; calculated 6.45%
Al found 7.6%; calculated 7.55%

Example 2

A solution of 23.0 g.=0.139 mol sodium tetraethyl aluminum in 100 cc. benzene is added to a suspension of 5.1 g.=0.051 mol phenyl sodium in 70 cc. benzene prepared from sodium and diphenyl mercury and the whole is stirred at 80° to 90° C. In about 20 hours gas formation yields 47.2% of the theoretical amount of ethane. The phenyl sodium has now obviously been destroyed by side reactions, marked brown coloring of the solution, since the reaction does not proceed any further.

If small amounts of insoluble material are filtered off at this stage, two liquid phases appear in the filtrate. The upper layer is faintly brown-colored and consists almost solely of benzene. The lower, very brown phase yields a small amount of diphenyl when heated in high vacuo ($10^{-3}$ torr) to approximately 150° C. The residue has the composition of sodium diethyl diphenyl aluminum. If benzene and some sodium phenyl are again added, ethane again begins to split off and the test mixture finally looks similar to one obtained with sodium iso-octylate.

Working up of the reaction product is similar to that described in Example 1 for the reaction with sodium alcoholate.

Example 3

Other sodium alcoholates can also be employed in place of the sodium iso-octylate used in Example 1. For example, equally good yields were obtained with approximately the same reaction speed with sodium butylate, sodium hexylate, sodium-n-octylate or sodium-n-decylate as are obtained with sodium iso-octylate. When sodium methylate or ethylate are used the reaction is slower.

Example 4

Sodium alkoxy triethyl aluminum compounds such as

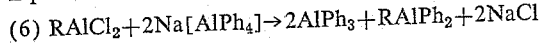
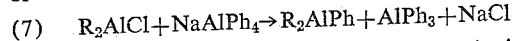

can also be employed in place of the sodium tetraethyl aluminum used in Examples 1, 2 and 3. Equally good yields, based on the ethyl groups present are obtained.

Example 5

Reaction is carried out as in Example 1; 132 g. sodium tetraethyl aluminum and 120 g. sodium isooctylate in 1000 cc. benzene are reacted at 120° C., but in a closed, pressure-resistant vessel provided with a reflux condenser. At the head of the condenser the ethane produced in the reaction is drawn off, 33 litres ethane (N.T.P.) during the first 2.5 hours, i.e., 1.85 mol ethane per mol $NaAl(C_2H_5)_4$, 7 litres in the next 2.5 hours and about 10 litres ethane in a further 10 hours. After 15 to 20 hours the reaction is complete, as may be seen from the cessation of ethane formation. In all, 52 litres ethane (N.T.P.), i.e., 3 mols ethane per mol of sodium tetraethyl aluminum introduced, were obtained. Working up is effected similarly to that described in Example 1.

Example 6

25.3 g. of the crude product of sodium tetraphenyl aluminum obtained in the above examples, filtered off from the benzene solution and washed with hot benzene, are suspended in toluene and stirred with an amount proportional to the sodium content (8.5% by weight) of 9.35 g. (=0.1 mol) dimethyl aluminum monochloride at 100°

C. for about 4 hours. After the precipitated NaCl has settled the clear solution on top is siphoned off and the precipitate is again washed with benzene or toluene. The combined solutions are vaporized, finally in vacuo, until at $10^{-3}$ torr and 140° C. nothing more is converted. Triphenyl aluminum, which can be recrystallized from a little toluene, is obtained as distillation residue; the yield is 70% based on sodium tetraphenyl aluminum. If based on the sodium tetraethyl aluminum originally introduced into the reaction, the yield amounts to 50%.

*Example 8*

0.1 mol diethyl aluminum chloride, 0.05 mol methyl aluminum dichloride, 0.05 mol ethyl aluminum dichloride or 0.075 mol methyl or ethyl aluminum sesqui-chloride can be employed in place of the dimethyl aluminum chloride described in Example 6. The yields are also satisfactory in these cases.

We claim:

1. Process for the manufacture of phenyl aluminum compounds, wherein a sodium tetra-alkyl aluminum compound is reacted with benzene in the presence of a compound selected from the group consisting of sodium alcoholates and phenyl sodium, and recovering the sodium tetraphenyl aluminum thereby formed.

2. Process according to claim 1, wherein reaction of the sodium tetra-alkyl aluminum with benzene is effected at temperatures between 60° and 250° C.

3. Process according to claim 2, wherein reaction is effected at temperatures between 80° and 130° C.

4. Process according to claim 1, wherein reaction of the sodium tetra-alkyl aluminum compound is effected in presence of a sodium alcoholate, equimolar quantities of these two materials being used.

5. Process according to claim 1, wherein reaction is effected in presence of a sodium alcoholate, which is added increment wise to the reaction mixture.

6. Process according to claim 1, wherein a sodium alcoholate with a hydrocarbon chain of 4 to 10 C. atoms is present in the reaction.

7. Process according to claim 1, wherein there is used as reactant in place of said sodium tetra-alkyl aluminum compound a corresponding organo-aluminum compound at least one of the alkyl radicals of which is replaced by an alkoxy radical.

8. Process according to claim 1, wherein the sodium tetraphenyl aluminum produced in said reaction is converted into triphenyl aluminum by reaction with a compound selected from the group consisting of an aluminum halide and an alkyl aluminum halide.

9. Process according to claim 8, wherein said conversion into triphenyl aluminum is carried out by reaction with an aluminum halide.

10. Process according to claim 8, wherein said conversion into triphenyl aluminum is carried out by reaction with an alkyl aluminum halide.

No references cited.

TOBIAS E. LEVOW, *Primary Examiner.*

H. M. S. SNEED, *Assistant Examiner.*